COLOR TELEVISION APPARATUS

Filed Oct. 21, 1952 2 Sheets-Sheet 1

WITNESSES:

E. A. McCloskey.

Wm. B. Sellers.

INVENTOR

Charles W. Baugh, Jr.

BY

F. E. Browder

ATTORNEY

May 14, 1957 C. W. BAUGH, JR 2,792,446

COLOR TELEVISION APPARATUS

Filed Oct. 21, 1952 2 Sheets-Sheet 2

WITNESSES:

E. A. McCloskey.

Wm. B. Sellers.

INVENTOR

Charles W. Baugh, Jr.

BY

F. E. Browder

ATTORNEY 2,792,446

COLOR TELEVISION APPARATUS

Charles W. Baugh, Jr., Princeton, N. J., assignor to Westinghouse Electric Corporation, East Pittsburgh, Pa., a corporation of Pennsylvania Application October 21, 1952, Serial No. 315,963

3 Claims. (Cl. 178—5.4)

My invention relates to color television receivers and, in particular, to an arrangement for detecting in picture receivers and causing them to respond to a key or synchronizing pulse sent out as part of the picture-synchronizing signals by the transmitter.

A color television broadcasting system now in public operation transmits signals representing entire picture fields, or "frames," consecutively, first for the red coloration in the picture, then for the blue coloration, and then for the green coloration, repeating this sequence as long as the picture is being broadcast. At the receiver the picture screen presents in succession to the observer's eyes, first, an image in red light which varies from point-to-point to correspond to the "red" field, then an image in blue light varying to correspond to the "blue" field, and then an image in green light to correspond to the green field. Such a system is known as a "field-sequential" transmission.

In conventional black-and-white television receivers, it is necessary that the electron beam which scans the picture screen to reproduce each field shall scan line-by-line in synchronism with scanning of the image at the transmitter, and to maintain this synchronism between the scanning at opposite ends of the system, so-called "sync" (i. e., synchronizing) pulses are transmitted at the completion of each horizontal picture-line and at the end of each picture field. The Federal Communications Commission has published regulations standardizing the form and spacing of such synchronizing pulses to be used in public broadcasting, and these prescribe that the "sync" pulse which is transmitted between the completion of the scanning of one field and the beginning of the succeeding field (i. e., the so-called "vertical sync pulse") shall be both preceded and followed by a series of six short voltage pulses called the "equalizing" pulses. Fig. 1 of the drawings shows this in detail.

In the field-sequential broadcasting mentioned above, it is necessary to change the color of the picture seen by the observer with each new field that is presented, and the "vertical sync pulses" offer a convenient signal for keying a proper servo-device to make this change. The form taken by the servo-device for making this change of color presentation is not particularly important to the invention I am now describing since numerous "round-robin" networks are known which can energize one after another of three devices in rotation in response to a succession of incoming voltage pulses. However, for illustrative purposes, reference may be had to the picture tube and circuit shown in Fig. 3 of this application wherein a kinescope has three electron guns which are turned on, one at a time for each field color to respectively stimulate red, blue and green light phosphors on the picture screen.

However, it is necessary with any servo system to insure that the red-light picture be presented to the observer's eyes when a "red" field signal is coming in from the transmitter, and hence it is necessary that the receiver be able to distinguish between vertical sync pulses preceding fields of different color. To make this distinction possible, the field-sequential broadcast system mentioned above interpolates an extra voltage pulse between the first and second of the equalizing pulses which precede transmission of a "red" field.

One object of my present invention is to provide an arrangement which shall be responsive to the voltage pulse occurring between the first and second equalizing pulses of a field of a particular color in a color television broadcast system.

Another object of my invention is to provide a color television receiver for use on field-sequential transmissions with a relay responding to signal pulses only if they occur between the first and second equalizing pulses of the "red" field in a picture transmission.

Another object is to provide an arrangement for exciting light-emission in a succession of colors, one color at a time, in a color television receiver screen in synchronism with signal-color changes of a picture transmission.

Another object is to provide means for "gating" a plurality of differently colored light emitters in a color television picture tube in synchronism with color changes of incoming pictures.

Yet another object is to provide an arrangement for turning on and off successively a plurality of electron guns in a color television picture receiver in synchronism with changes in color signals coming in from a picture transmitter.

Other objects of my invention will become apparent upon reading the following description taken in connection with the appended drawings in which.

Figure 1:
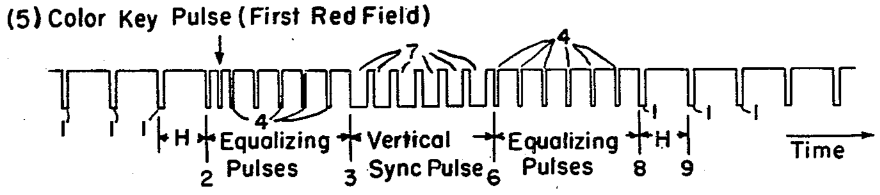
Figure 1 is a graph showing a portion of the "sync" signal used in a field-sequential color television broadcast.

Referring in detail to Fig. 1 of the drawings, the ordinates represent voltage and abscissae represent time for the synchronizing signals sent out by a television transmitter of color pictures of the field-sequential type. Thus, 1, 1 represents the line "sync" pulses transmitted in the intervals between scanning of horizontal lines in the picture being sent out. Similarly, H represents the interval of time during which the lowest line of the last green-light field of the picture is being scanned. During the following interval 2—3, six equalizing pulses 4 are being transmitted, and between the first and second of pulses 4, a key pulse 5 is interjected. During the interval 3—6, six pulses 7 constituting the "vertical sync pulse" are sent out; and these are followed during the interval 6—8 by six more equalizing pulses 4; and then the scanning of the top line of a "red" field begins, the horizontal sync pulses 1 beginning once more. It may be noted that the various pulses differ materially in width, the equalizing pulses being narrowest of all. The pulse 5 is, however, unique in that it is the only one of these pulses which succeeds its precedent pulse by a time interval not greater than $$\frac{H}{2}$$

Figure 2:
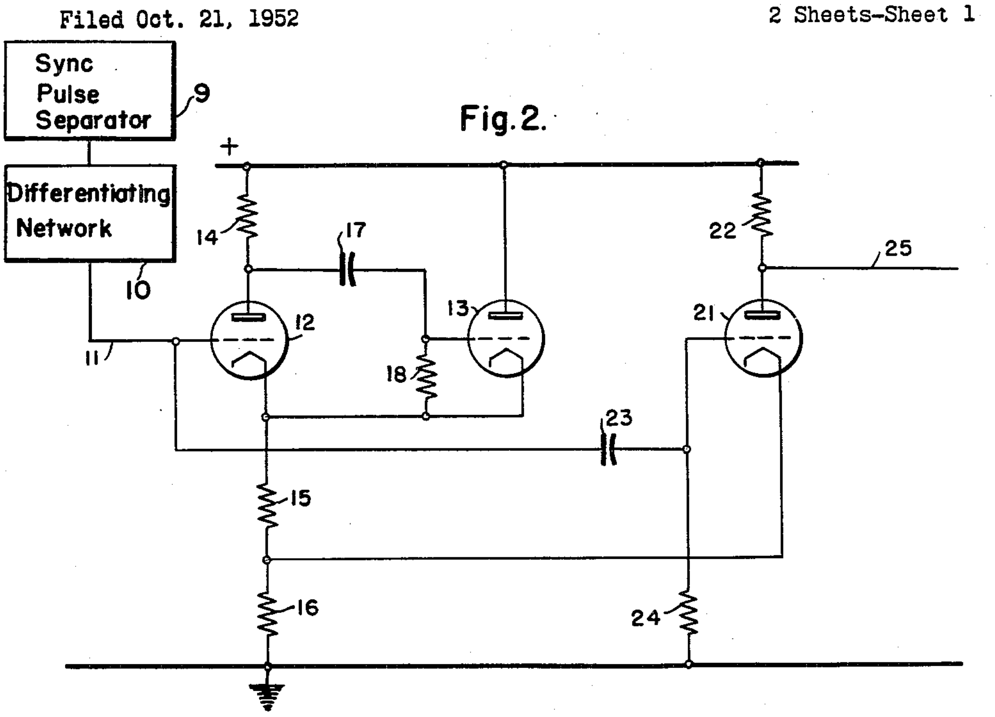
Fig. 2 is a schematic diagram of a circuit embodying one form of my invention.

As previously stated, it is desired to obtain, for keying a color control circuit in the receiver, a voltage pulse which is responsive solely to the color pulse 5 of Fig. 1. The circuit of Fig. 2 will produce this result. The synchronizing pulses are segregated or separated from the incoming television signals in the sync pulse separator 9 and are applied to a differentiating network 10. A conductor 11 is connected to the differentiating network 10 which passes only the leading edges of the sync pulses, and when one of these arrives, it impresses a positive pulse on the control grid of tube 12 of a one-shot multivibrator comprising tubes 12 and 13. Tube 12 has its anode connected through a resistor 14 to the positive terminal of a voltage source (not shown) the negative terminal of which is grounded. The cathode of tube 12 is connected to ground through two resistors 15, 16. The anode of tube 13 is connected directly to the above-mentioned positive terminal, and its cathode is connected to that of tube 12. A capacitor 17 connects the anode of tube 12 to the grid of tube 13, and the latter is connected to its cathode by a resistor 18. A third tube 21 has its anode connected to the above-mentioned positive terminal through a resistor 22 and has its control electrode connected through a capacitor 23 to the input conductor 11 and through a resistor 24 to ground. The cathode of tube 21 is connected to the common terminal of resistors 15 and 16. A servo-control lead 25 is connected to the anode of tube 21.

The potential of input conductor or terminal 11 is biased to such a voltage that, in the absence of a positive voltage pulse, tube 12 is non-conductive, but tube 13 is of a type such that, in the absence of current flow in resistor 18, it is conductive and sends a substantial current to ground through resistors 15, 16. In the absence of a voltage pulse on input terminal 11, the control-electrode of tube 21 is at ground potential but its cathode is positive to ground by the amount of the voltage drop produced in resistor 16 by the current flowing in tube 13, and this voltage drop is made sufficient to cut off current flow through tube 21. Capacitor 17 is charged to a voltage equal to the drop from the positive source terminal to the end of resistor 15.

When any of the pulses above-mentioned strikes terminal 11, it is sufficient to render tube 12 conductive. Capacitor 17 starts to discharge through tube 12, and the voltage drop thus produced in resistor 18 makes the grid of tube 13 sufficiently negative to its cathode so that current flow ceases through tube 13 to resistors 15 and 16. The voltage drop in resistor 16 makes the cathode of tube 21 less positive relative to ground, and this prepares tube 21 to start easily if a positive pulse is impressed on its control grid.

As capacitor 17 discharges, the current through resistor 18 soon sinks to so low a value that the grid of tube 13 is no longer able to keep it non-conductive, and current flow through it to resistors 15, 16 is resumed. This raises the cathode of tube 12 to a sufficiently positive potential so that this tube is cut off and the multivibrator 12, 13 has been returned to its initial condition. The period of this cycle is made about half the time period, H, separating picture lines. The next succeeding sync pulse starts the multivibrator cycle again, but arrives after the multivibrator has returned to its initial condition. However, the red color pulse 5 follows the first vertical sync pulse by a period less than $$\frac{H}{2}$$

and so is impressed on the control electrode of tube 21 through capacitor 23 while the cathode of tube 21 is at low potential by reason of the cessation of current flow from tube 13 through resistor 16. Tube 21 thus fires, producing current flow in resistor 22 and impressing a voltage pulse on control lead 25.

The length of the non-conductive period in tube 13 can be fixed by varying the size of resistor 18. It may preferably be made from 30 to 50 percent of the period H separating horizontal sync pulses.

It will be seen that the color pulse preceding a red field will produce a pulse in the output lead 25 from tube 21, but sync pulses produce no such effect. At pulse in output lead 25 may be made to turn on the scanning beam which excites the red-emitting phosphors in the screen of the picture-receiver tube.

To further safeguard the system from any chance that multivibrator 12, 13 might be fired just prior to a sync pulse by noise or other unwanted pulses thereby admitting a rapidly-following sync pulse to pass through tube 21 to output 25, tube 21 could be gated off except during the interval in every field which includes the first and second equalizing pulses.

Figure 3:
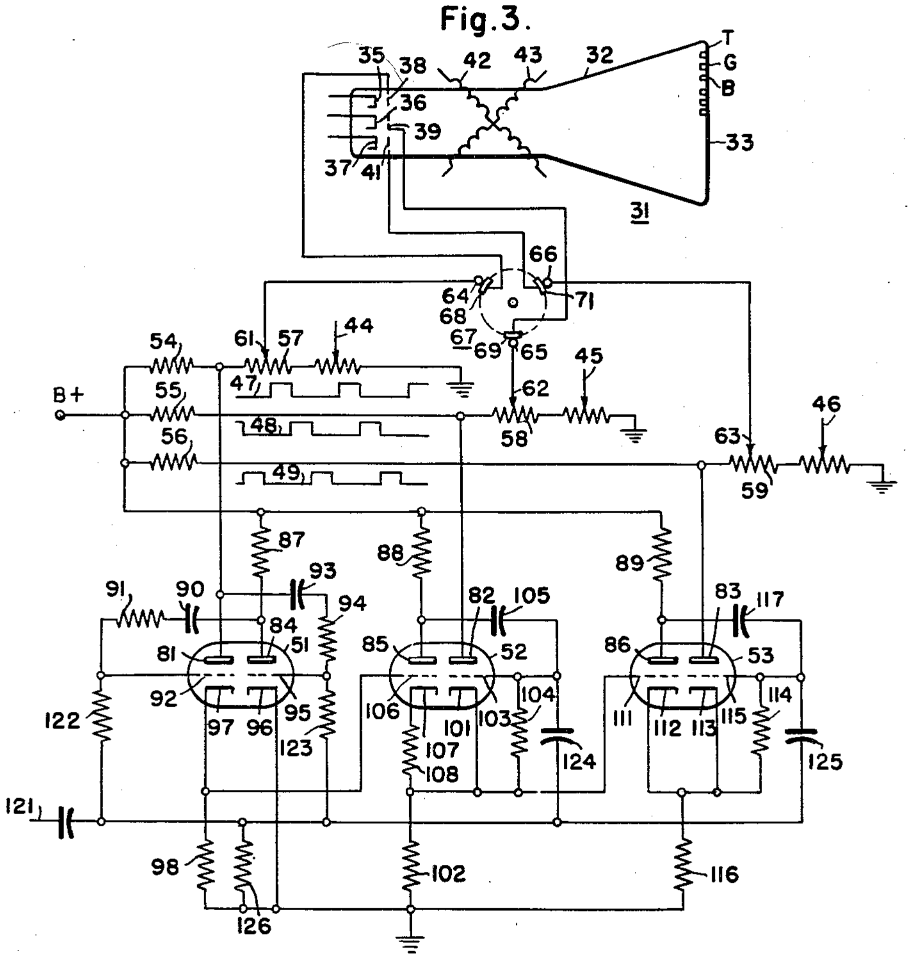
Fig. 3 is a schematic diagram of a color-picture-receiving tube and a circuit for controlling its scanning beams in synchronism with incoming color signals and which embodies another feature of my invention.

One circuit for turning on the scanning beam which excites the red-emitting phosphor is shown in Fig. 3 in which picture-reproducing tube 31 comprises a vacuum-tight container 32 having a fluorescent output screen 33 at one end and three electron guns 35, 36 and 37 at its other end, the latter being provided with control electrodes 38, 39, 41 and being otherwise so similar to those known in the television picture-receiver tube art that further description here is believed to be unnecessary. The screen 33 comprises horizontal strips of phosphor divided into groups of three R, G, B, which respectively emit red, green, and blue light when bombarded by scanning beams of conventional type from the electron guns 35, 36, and 37 respectively. The groups of three strips preferably occupy about the same vertical space as one horizontal line on a conventional black-and-white television receiver-tube screen. The tube 31 is provided with conventional beam-deflecting means 42, 43 which cause the scanning beams to scan the screen 33 in horizontal lines in the way usual in television picture receivers, painting a picture of intensity varying from point to point under influence of signal voltages impressed on the circuits of control electrodes 38, 39, 41. Such signal voltages may be so impressed, for example, at the conductors or terminals 44, 45, 46. As previously explained, the beam from electron gun 35 is intended to be first turned on to scan the red-emitting strips R on screen 33 during transmission of a red-light picture field, the electron guns 36 and 37 being turned off; the electron gun 36 then is turned on to scan the green-emitting strips G during the green-image field, the guns 35 and 37 being turned off; and electron gun 37 then scans the screen during transmission of the blue-image field. This program is followed as long as the television transmission continues.

The turning-on and shutting-off of the electron guns in accordance with this program is effected by periodic rectangular gating pulses of voltage derived from the remaining circuit elements shown in Fig. 3. The form of these voltage pulses is indicated at 47, 48 and 49, and they are generated by three electron tubes 51, 52, 53, each of the twin-triode type. Three channels respectively comprising first resistors 54, 55, 56 in series with voltage dividers 57, 58, 59 are connected between the positive terminal B+ of a voltage source and its grounded negative terminal. Variable taps 61, 62, 63 on these voltage dividers connect them respectively to the equally-spaced stationary contacts 64, 65, 66 of a three-channel switch 67 which is turned only in initial adjustment of the receiver. This switch 67 has a member which may be turned by hand to any one of three positions, and bearing three equally-spaced movable contacts 68, 69, 71 which are respectively connected to the control electrodes 38, 39, 41. The switch 67 is set forth in greater detail in a pending application of R. L. Kindred, Serial No. 304,790, filed August 16, 1952 (W. E. 27,007), assigned to the same assignee.

In accordance with a modification of my invention, if desired this switch member may be omitted from the circuit, and the variable taps 61, 62 and 63 directly connected respectively to control electrodes 38, 39 and 41.

The lower terminals of resistors 54, 55, 56 are respectively connected to one anode 81, 82, 83 of the twin triodes 51, 52, 53. The other anode 84, 85, 86 in each said twin triode is connected through a resistor 87, 88, 89 to the positive terminal of source B+.

The anode 84 is connected through a capacitor 90 and resistor 91 to the control grid 92 in tube 51, and the anode 81 in that tube is connected through a capacitor 93 and a resistor 94 to the control grid 95 of tube 51. The cathode 96 associated with anode 84 is connected directly to ground, and the other cathode 97 of tube 51 is connected to ground through a resistor 98. The circuits of tube 51 will be recognized as making it a free-running multivibrator.

The cathode 101 associated in twin triode 52 with anode 82 is connected to ground through a resistor 102 and to its control grid 103 through a resistor 104. Control grid 103 is connected to anode 85 of tube 52 through a capacitor 105. Control grid 106 associated with anode 85 is connected to cathode 97 of tube 51, while the associated cathode 107 is connected through a resistor 108 to the cathode 101, and to a control grid 111 which governs current flow to anode 86 in tube 53. The cathode 112 associated with anode 86 is connected to cathode 113 in the same tube and through a resistor 114 to the control grid 115 which governs current from cathode 113. Cathode 112 is also connected to ground through resistor 116. Control grid 115 is connected to anode 86 in the same tube 53 through a capacitor 117.

An input conductor or terminal 121 on which is impressed the key pulse 5 which precedes every red field is connected by a pair of resistors 122 and 123 to the control grids 92 and 95 in tube 51; is also connected through a capacitor 124 to the control grid 103 in tube 52, and through a capacitor 125 to the control grid 115 in tube 53. An input resistor 126 connects the input terminal 121 to ground. With the above-described connections, tubes 52 and 53 act as one-shot multivibrators. All three twin triodes 51, 52, 53 may be of the 12AU7 type.

The control grids of the tubes 51, 52, and 53 are so biased that, in the absence of key pulses 5 on input terminal 121, current flows from anodes 81, 82 and 83 but not in substantial amount from anodes 84, 85, 86. As a result of the detouring of current from resistors 57, 58, 59 through anodes 81, 82, 83 the voltage-divider taps 61, 62, 63 are reduced nearly to ground potential, and the control electrodes 38, 39 and 41 shut off all three scanning beams in picture tube 31.

The first key pulse coming into input terminal 121 appears at once at control grid 95 of tube 51 and starts current flow from its associated anode 84, thereby initiating the pulsing cycle of multivibrator tube 51, stopping current flow through anode 81 and impressing its positive pulse through voltage divider 57, tap 61 thereof and switch member 67 onto the control electrode 38 in picture tube 31. This turns on electron gun 35 to scan the red-emitting phosphor on screen 33 therein, and this scanning continues for the duration of the positive pulse from multivibrator 51.

The capacitors and resistors of tube 51 are adjusted to make the length of the positive pulse equal to the period of one field of the incoming picture, and this starts current flow from anode 81, removes the positive voltage at tap 61 and electron-gun control electrode 38, and returns tube 51 to its non-conducting state to end the positive pulse shown at curve 47.

The resumption of current flow from anode 81 and cathode 97 of tube 51 through resistor 98 impresses a positive voltage on the grid 106 of one-shot multivibrator 52, thereby starting it upon the voltage cycle indicated by curve 48 to turn on the scanning beam from electron gun 36 in picture tube 31 and cause it to scan the green-emitting phosphor on screen 33 just as was previously described for the control of electron gun 35 by the voltage of curve 47.

At the end of the pulse period of multivibrator 52, its resistor 102 impresses a pulse to initiate the pulse period of one-shot multivibrator 53 which turns on and shuts off the electron beam from electron gun 37 scanning the blue-emitting phosphor B on screen 33 of picture tube 31 in a way similar to that described for control of electron guns 35 and 36.

The periods of voltage pulses 47, 48, 49 are adjusted in ways well known in the art, each to equal one field period of the transmitted picture, and termination of scansion of the blue-emitting phosphor B is followed by the key pulse 5 preceding a red-light picture field which is transmitted through tube 51 to switch on electron gun 35 which starts scanning the red-emitting phosphor R. The multivibrator network of Fig. 3 is thus again started on its cycle, and the picture reproduction on screen 33 goes forward in proper synchronism with the transmission from the sending end.

While I have described my invention as it is applied to incoming signals of a color television system, it is also applicable to other systems in which it is desired to provide an arrangement capable of transmitting a key signal occurring at a particular time in a succession of periodic pulses or other events, as will be readily evident to those skilled in the art.

I claim as my invention:

1. In a receiver for color television signals in which signals representing red, blue and green picture fields occur in periods separated by intervals containing a series of equalizing pulses each substantially shorter than said periods, and in which each field of one of such colors is preceded by one equalizing pulse which is subdivided by a keying pulse of short duration, three scanning beams respectively stimulating emission of red, blue and green light from a picture screen, and each provided with a control electrode for turning it off and on, means including a three-phase generator having three output terminals respectively producing in rotation positive voltage pulses of the same duration as said color fields, connections to impress the voltages of said three output terminals on the three control electrodes for said scanning beams, a grid-controlled tube having a control electrode normally biased to cut-off connected to trigger said three-phase generator to begin impressing a positive pulse at the terminal connected to the control electrode which stimulates said one of such colors, a normally inactive generator of voltage pulses having a duration between thirty and fifty percent of that of one said field connected to trigger said three-phase generator, and means responsive to arrival of an equalizing pulse to trigger said normally inactive generator into action to drive said grid-controlled tube above cut-off and trigger said three-phase generator.

2. In a color television receiver having three control grids governing respectively the stimulation to emissivity of red, blue and green-emitting phosphors in rotation responsive to picture signals corresponding to color images which are separated by sync pulses, means for impressing positive voltage pulses successively on said three control grids synchronously with said picture signals comprising a first multivibrator circuit including a first electron tube having an input electrode, means to cause said first electron tube to generate a first positive output pulse, a second multivibrator circuit including a second electron tube having an input electrode connected to said first multivibrator circuit, means to cause said second electron tube to generate a second positive output pulse initiated by termination of said first output pulse, a third multivibrator circuit including a third electron tube having an input electrode connected to said second multivibrator circuit, means to cause said third electron tube to generate a third positive output pulse initiated by termination of said second output pulse, and connections from said first, second and third multivibrator circuits respectively to impress said first, second and third positive output pulses on said three control grids respectively.

3. In a color television receiver, a control channel for each of the different color images transmitted and means for connecting incoming signals to said channels in a predetermined rotation, means for segregating and passing on incoming sync pulses in the incoming signals, a normally inactive generator of positive voltage pulses of duration substantially less than the periodic time of said sync pulses, means to cause said generator, upon arrival of each said sync pulse, to generate one said positive voltage pulse, means to impress said positive voltage pulse on the control electrode of a normally cut-off gating tube, and means in the output of said gating tube responsive to pulses following a sync pulse by a time substantially shorter than the duration of said positive voltage pulses to energize the first channel of said predetermined rotation.

References Cited in the file of this patent

UNITED STATES PATENTS

| | | |
|---|---|---|
| 2,577,827 | Tompkins | Dec. 11, 1951 |
| 2,617,876 | Rose | Nov. 11, 1952 |
| 2,644,032 | Maher et al. | June 30, 1953 |
| 2,652,491 | Maher et al. | Sept. 15, 1953 |
| 2,709,717 | Werenfels | May 17, 1955 |